US010852492B1

(12) United States Patent
Vermeulen et al.

(10) Patent No.: US 10,852,492 B1
(45) Date of Patent: Dec. 1, 2020

(54) TECHNIQUES TO COMBINE TWO INTEGRATED PHOTONIC SUBSTRATES

(71) Applicant: Acacia Communications, Inc., Maynard, MA (US)

(72) Inventors: Diedrik Vermeulen, Somerville, MA (US); Christopher Doerr, Middleton, NJ (US)

(73) Assignee: Acacia Communications, Inc., Maynard, MA (US)

( * ) Notice: Subject to any disclaimer, the term of this patent is extended or adjusted under 35 U.S.C. 154(b) by 0 days.

(21) Appl. No.: 14/926,868

(22) Filed: Oct. 29, 2015

Related U.S. Application Data

(60) Provisional application No. 62/069,879, filed on Oct. 29, 2014.

(51) Int. Cl.
  *G02B 6/42* (2006.01)
  *G02B 6/125* (2006.01)
  *G02B 6/12* (2006.01)

(52) U.S. Cl.
  CPC .......... *G02B 6/423* (2013.01); *G02B 6/12002* (2013.01); *G02B 6/125* (2013.01); *G02B 6/4251* (2013.01); *G02B 2006/12097* (2013.01); *G02B 2006/12147* (2013.01)

(58) Field of Classification Search
  CPC .... G02B 6/423; G02B 6/12002; G02B 6/125; G02B 6/4251; G02B 2006/12097; G02B 2006/12147
  See application file for complete search history.

(56) References Cited

U.S. PATENT DOCUMENTS

| | | | | | |
|---|---|---|---|---|---|
| 4,883,561 | A | * | 11/1989 | Gmitter | B32B 43/00 117/915 |
| 5,475,775 | A | * | 12/1995 | Kragl | G02B 6/30 264/1.24 |
| 5,545,291 | A | * | 8/1996 | Smith | G02F 1/1362 257/E21.505 |
| 5,574,806 | A | * | 11/1996 | Kragl | G02B 6/30 385/131 |

(Continued)

FOREIGN PATENT DOCUMENTS

WO   WO 2016/007867 A2   1/2016

OTHER PUBLICATIONS

Bowers et al., A Technology for Integrating Active Photonic Devices on SOI Wafers, Conference—Indium Phosphide and Related Materials Conference, 2006.*

(Continued)

*Primary Examiner* — Peter Radkowski
(74) *Attorney, Agent, or Firm* — Joseph D'Angelo

(57) ABSTRACT

Structures and methods for passively aligning a photonic die with a receiving substrate are described. Three alignment surfaces, having dimensions greater than a desired alignment accuracy, may be formed on the photonic die and used to passively and accurately align the photonic die to a receiving substrate in six degrees of freedom. Two of the three alignment surfaces on the photonic die may be formed in a single mask-and-etch process, while the third alignment surface may require no patterning or etching. Three complementary alignment surfaces on the receiving substrate may be formed in a single mask-and-etch process.

21 Claims, 9 Drawing Sheets

(56) References Cited

U.S. PATENT DOCUMENTS

| | | | | |
|---|---|---|---|---|
| 5,621,837 A * | 4/1997 | Yamada | G02B 6/42 | 385/88 |
| 5,783,856 A * | 7/1998 | Smith | G02F 1/1362 | 257/618 |
| 5,814,885 A * | 9/1998 | Pogge | H01L 23/13 | 257/684 |
| 5,883,988 A * | 3/1999 | Yamamoto | G02B 6/42 | 250/227.15 |
| 5,883,996 A * | 3/1999 | Knapp | G02B 6/423 | 385/88 |
| 5,909,524 A * | 6/1999 | Tabuchi | G02B 6/423 | 385/14 |
| 6,066,513 A * | 5/2000 | Pogge | H01L 21/30608 | 257/E21.223 |
| 6,333,553 B1 * | 12/2001 | Pogge | H01L 24/95 | 257/723 |
| 6,366,468 B1 * | 4/2002 | Pan | | |
| 6,391,214 B1 * | 5/2002 | Kovacic | G02B 6/42 | 216/24 |
| 6,449,080 B1 * | 9/2002 | McBrien | G02F 1/2255 | 359/245 |
| 6,457,811 B1 * | 10/2002 | Pan et al. | | |
| 6,459,158 B1 * | 10/2002 | Delprat | G02B 6/423 | 257/685 |
| 6,547,452 B1 * | 4/2003 | Chan | B29C 45/14065 | 385/134 |
| 6,548,325 B2 * | 4/2003 | Pogge | H01L 24/95 | 257/E21.705 |
| 6,690,694 B2 * | 2/2004 | Deacon | H01S 5/02248 | 372/29.02 |
| 6,693,936 B2 * | 2/2004 | Kitaoka | G02B 6/12004 | 372/50.1 |
| 6,864,570 B2 * | 3/2005 | Smith | G02F 1/1362 | 257/701 |
| 6,925,098 B2 * | 8/2005 | Deacon | H01S 5/02248 | 372/20 |
| 6,962,835 B2 * | 11/2005 | Tong | B23K 20/02 | 257/E21.505 |
| 6,964,804 B2 * | 11/2005 | Steinberg | G02B 6/4204 | 216/2 |
| 7,110,630 B2 * | 9/2006 | Suzuki | B82Y 20/00 | 385/14 |
| 7,161,726 B2 * | 1/2007 | Bintz | G02F 1/3134 | 359/254 |
| 7,223,635 B1 * | 5/2007 | Brewer | B81C 3/002 | 257/E21.505 |
| 7,232,743 B2 * | 6/2007 | Aulnette | H01L 21/76259 | 257/192 |
| 7,263,249 B2 * | 8/2007 | Suzuki | B82Y 20/00 | 385/14 |
| 7,373,052 B2 * | 5/2008 | Nadeau | G02B 6/423 | 385/39 |
| 7,522,648 B2 * | 4/2009 | Park | G02B 6/4232 | 372/50.1 |
| 7,535,089 B2 * | 5/2009 | Fitzgerald | H01L 21/76254 | 257/103 |
| 7,653,104 B2 * | 1/2010 | Fujimoto | B82Y 20/00 | 372/45.011 |
| 7,703,991 B2 * | 4/2010 | Lu | G02B 6/4232 | 385/88 |
| 7,715,663 B2 * | 5/2010 | Carothers | G02F 1/225 | 385/3 |
| 7,727,804 B2 * | 6/2010 | Smith | G02F 1/1362 | 257/E21.598 |
| 7,732,237 B2 * | 6/2010 | Xie | B82Y 10/00 | 257/E33.014 |
| 7,754,507 B2 * | 7/2010 | Epler | H01L 33/0079 | 257/E21.511 |
| 7,848,601 B2 * | 12/2010 | Carothers | G02F 1/225 | 385/3 |
| 7,851,780 B2 * | 12/2010 | Hudait | H01L 21/02381 | 257/14 |
| 7,928,573 B2 * | 4/2011 | Onishi | H01L 21/76882 | 257/741 |
| 8,110,823 B2 * | 2/2012 | Bowers | H01L 31/1852 | 257/14 |
| 8,111,994 B2 * | 2/2012 | Popovic | G02B 6/12007 | 359/247 |
| 8,257,990 B2 * | 9/2012 | Koch | G02B 6/4204 | 257/E21.158 |
| 8,559,478 B2 * | 10/2013 | Sysak | B82Y 20/00 | 372/108 |
| 8,604,577 B2 * | 12/2013 | Koch | G02B 6/4204 | 257/432 |
| 8,655,114 B2 * | 2/2014 | Popovic | G02B 6/12007 | 385/1 |
| 8,767,792 B2 * | 7/2014 | Bowers | H01S 5/0424 | 372/43.01 |
| 8,912,017 B2 * | 12/2014 | El-Ghoroury | H01L 27/14618 | 257/E21.514 |
| 8,937,296 B2 * | 1/2015 | Bowers | H01L 31/1852 | 257/14 |
| 8,941,460 B2 * | 1/2015 | Li | H01L 23/645 | 336/200 |
| 9,097,848 B2 * | 8/2015 | Bowers | H01L 31/1852 | |
| 9,111,943 B2 * | 8/2015 | Chow | H01L 24/13 | |
| 9,442,247 B2 * | 9/2016 | Deppe | G02B 6/12004 | |
| 2001/0041029 A1 * | 11/2001 | Steinberg | G02B 6/30 | 385/50 |
| 2002/0009612 A1 * | 1/2002 | Ramesh | B32B 9/00 | 428/688 |
| 2002/0011652 A1 * | 1/2002 | Pogge | H01L 24/95 | 257/668 |
| 2002/0072138 A1 * | 6/2002 | Trezza | H01L 31/167 | 438/23 |
| 2002/0168864 A1 * | 11/2002 | Cheng | H01L 21/76256 | 438/725 |
| 2003/0059622 A1 * | 3/2003 | Steinberg | G02B 6/4204 | 428/426 |
| 2003/0081902 A1 * | 5/2003 | Blauvelt | G02B 6/125 | 385/50 |
| 2003/0086448 A1 * | 5/2003 | Deacon | H01S 5/02248 | 372/20 |
| 2003/0095757 A1 * | 5/2003 | Burmeister | G02B 6/4212 | 385/88 |
| 2003/0174968 A1 * | 9/2003 | Kang | G02B 6/4204 | 385/52 |
| 2004/0066806 A1 * | 4/2004 | Deacon | H01S 5/02248 | 372/20 |
| 2004/0070312 A1 * | 4/2004 | Penunuri | H03H 3/08 | 310/313 A |
| 2004/0190814 A1 * | 9/2004 | Suzuki | G02B 6/1225 | 385/14 |
| 2005/0067377 A1 * | 3/2005 | Lei | H01L 21/76256 | 216/33 |
| 2005/0105911 A1 * | 5/2005 | Keh | H01S 5/02212 | 398/138 |
| 2005/0135732 A1 | 6/2005 | Crow et al. | | |
| 2006/0093002 A1 * | 5/2006 | Park | H01S 5/0226 | 372/46.01 |
| 2006/0098910 A1 * | 5/2006 | Bintz | G02F 1/3134 | 385/2 |
| 2006/0245041 A1 * | 11/2006 | Suzuki | G02B 6/12004 | 359/321 |
| 2006/0251360 A1 * | 11/2006 | Lu | G02B 6/4232 | 385/88 |
| 2006/0281203 A1 * | 12/2006 | Epler | H01L 33/0079 | 438/22 |
| 2007/0072324 A1 * | 3/2007 | Krames | C30B 25/183 | 438/46 |
| 2007/0145586 A1 * | 6/2007 | Onishi | H01L 21/76882 | 257/741 |
| 2007/0258680 A1 * | 11/2007 | Nadeau | G02B 6/423 | 385/30 |
| 2008/0002929 A1 * | 1/2008 | Bowers | H01S 5/0424 | 385/15 |
| 2009/0162966 A1 * | 6/2009 | Jawarani | H01L 31/022425 | 438/67 |

(56) References Cited

U.S. PATENT DOCUMENTS

| | | | |
|---|---|---|---|
| 2009/0180504 A1* | 7/2009 | Fujimoto | B82Y 20/00 372/36 |
| 2009/0218666 A1* | 9/2009 | Yang | H01L 21/56 257/677 |
| 2009/0245298 A1* | 10/2009 | Sysak | B82Y 20/00 372/22 |
| 2010/0052084 A1* | 3/2010 | Yang | H01L 27/14698 257/432 |
| 2010/0053712 A1* | 3/2010 | Carothers | G02F 1/225 359/108 |
| 2010/0157402 A1* | 6/2010 | Carothers | G02F 1/225 359/108 |
| 2010/0297463 A1* | 11/2010 | Hoffstaedter | B23K 20/02 428/573 |
| 2011/0158278 A1* | 6/2011 | Koch | G02B 6/4204 372/45.012 |
| 2011/0168434 A1* | 7/2011 | Farooq | H01L 21/2007 174/257 |
| 2011/0227200 A1* | 9/2011 | Chow | H01L 24/81 257/618 |
| 2012/0126351 A1* | 5/2012 | Wilner | B81C 1/00301 257/418 |
| 2012/0189317 A1* | 7/2012 | Heck | H01S 5/021 398/141 |
| 2012/0288995 A1* | 11/2012 | El-Ghoroury | H01L 27/14618 438/107 |
| 2013/0022072 A1* | 1/2013 | Bowers | H01L 31/1852 372/45.01 |
| 2013/0107901 A1* | 5/2013 | Deppe | B82Y 20/00 372/36 |
| 2013/0121631 A1* | 5/2013 | Yu | G02F 1/0134 385/2 |
| 2013/0195137 A1* | 8/2013 | Bowers | H01S 5/0424 372/45.012 |
| 2013/0208752 A1* | 8/2013 | Koch | G02B 6/4204 372/45.012 |
| 2014/0023309 A1* | 1/2014 | Jiang | G02F 1/3133 385/3 |
| 2014/0079082 A1* | 3/2014 | Feng | H01S 5/101 372/20 |
| 2014/0104030 A1* | 4/2014 | Li | H01L 21/4814 336/220 |
| 2014/0251658 A1* | 9/2014 | Lin | H05K 1/0271 174/252 |
| 2014/0319656 A1* | 10/2014 | Marchena | H01L 24/83 257/615 |
| 2015/0358083 A1* | 12/2015 | Doerr | G02B 6/00 398/139 |

OTHER PUBLICATIONS

Weber, Alexis Christian, Precision Passive Alignment of Wafers, Massachusetts Institute of Technology, 2002 (Year: 2002).*

Bogaerts et al., Nanophotonic waveguides in silicon-on-insulator fabricated with CMOS technology. J Light Technol. Jan. 2005;23(1):401-12.

Kimerling, Silicon microphotonics. Appl Surf Sci. Jun. 2000;159/160;8-13.

Vivien et al., 42 GHz p.i.n Germanium photodetector integrated in a silicon-on-insulator waveguide. Opt Express. Apr. 2009;17(8):6252-7.

Wang et al., Ge-photodetectors for Si-based optoelectronic integration. Sensors (Basel). Jan. 2011;11(1):696-718. doi:10.3390/s110100696.

* cited by examiner

TECHNIQUES TO COMBINE TWO INTEGRATED PHOTONIC SUBSTRATES

RELATED APPLICATIONS

The present application claims the benefit under 35 U.S.C. § 119(e) of U.S. Provisional Patent Application Ser. No. 62/069,879 entitled "Techniques to Combine Two Integrated Photonic Chips," filed Oct. 29, 2014, which is incorporated herein by reference in its entirety.

BACKGROUND

Field

The present application relates generally to coupling optical signals between photonic devices or circuits on two separate substrates, and to aligning optical waveguides on a photonic die with optical waveguides on a receiving substrate.

Related Art

Silicon photonics is an attractive platform for future integration of photonic components, because it can take advantage of developed CMOS processes and tools from an established microelectronics industry. An aspect of silicon that detracts from its use in integrated photonics is that silicon has no direct bandgap, and thus cannot provide the optical gain needed for making a light source or optical amplifier. As a result, optical sources and amplifiers may be fabricated using a different type of semiconductor platform, such as indium phosphide (InP) or gallium arsenide (GaAs), on separate substrates from silicon photonic chips. Optical signals on one substrate may be transferred to another substrate via waveguides and/or optical couplers, but highly accurate alignment between the two substrates, on the order of sub-micron alignment tolerances, is needed when butt-coupling optical waveguides to obtain efficient optical coupling of a signal from one substrate to the other.

When packaging photonic chips that may include dies formed from different semiconductor types, conventional approaches include using precision micromanipulators and active feedback to position one substrate relative to another. Once in an aligned position, the substrates may be bonded in an aligned position. After the bond is set, the substrates may be released from the manipulators.

BRIEF SUMMARY

Aspects of the present technology relate to passive alignment of photonic dies to receiving substrates. Alignment surfaces may be patterned on a photonic die, and complementary alignment surfaces may be patterned on a receiving substrate. The alignment surfaces may have dimensions significantly larger than a required alignment accuracy between the photonic die and receiving substrate. Each set of alignment surfaces may be defined and located using a single lithography mask, and formed in a single etching step. When alignment surfaces on the photonic die contact alignment surfaces on the receiving substrate, one or more optical waveguides on the photonic die may align to one or more optical waveguides on the receiving substrate within required alignment accuracies in all six degrees of freedom. According to some embodiments, a photonic die may be placed on the receiving substrate in an unaligned position, and slid into an aligned position without the use of precision micro-positioning manipulators.

Some embodiments relate to a photonic die comprising a mesa having three alignment surfaces and a first waveguide formed on the mesa. The three alignment surfaces, when contacting complementary alignment surfaces on a receiving substrate, may provide passive alignment of the first waveguide in at least three degrees of freedom to a first optical waveguide on the receiving substrate. In some aspects, two of the three alignment surfaces are vertical surfaces forming sidewalls of the mesa that are non-orthogonal and non-parallel. According to some aspects, the three alignment surfaces, when contacting complementary alignment surfaces on the receiving substrate, may provide passive alignment of the first waveguide to the first optical waveguide in all six degrees of freedom (three translational degrees of freedom and three rotational degrees of freedom).

Some embodiments relate to a photonic die comprising a mesa formed on the photonic die, a first optical waveguide formed on the mesa, and three alignment surfaces formed at three locations with respect to the first optical waveguide. The three alignment surfaces may provide sub-micron passive alignment of the first optical waveguide in at least three degrees of freedom to a second optical waveguide on a receiving substrate.

Some embodiments relate to an apparatus comprising a photonic die that includes a mesa extending from a planar surface of the photonic die and an optical waveguide formed on the mesa. In some aspects, the mesa has a wedge-shaped contour.

Some embodiments relate to an array of repeated groups of photonic structures formed on a wafer, where each group comprises a mesa, a first optical waveguide formed on the mesa, and three alignment surfaces formed at three locations with respect to the first optical waveguide. The three alignment surfaces may provide sub-micron passive alignment of the first optical waveguide in at least three degrees of freedom to a second optical waveguide on a receiving substrate.

Some embodiments relate to a method of making a photonic die that can be passively aligned to a receiving substrate. The method may comprise acts of forming a first optical waveguide on a semiconductor substrate, forming a mesa that includes at least a portion of the first optical waveguide, and forming two alignment surfaces on the mesa at distances from the first optical waveguide that are determined with sub-micron accuracy.

BRIEF DESCRIPTION OF DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

DETAILED DESCRIPTION

Figure 1:
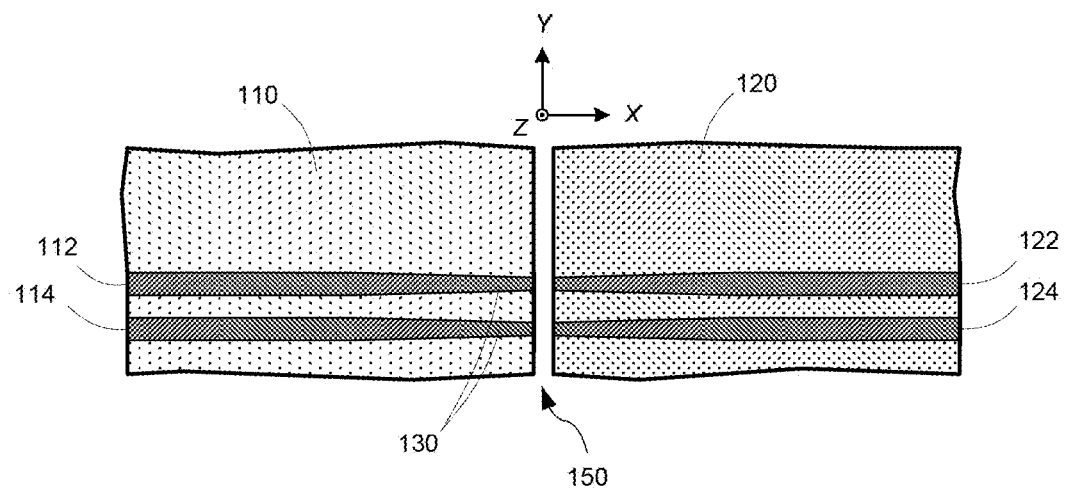
FIG. 1 depicts an arrangement for coupling optical signals from waveguides on a first photonic die to waveguides on a second photonic die.

The present technology pertains to photonic dies that may be mounted in photonic chips and included in photonic integrated circuits (PICs), and to related apparatus and methods. The PICs may be used in optical communication systems or other optical systems requiring integrated photonic devices. Aspects of the application include alignment structures formed on a photonic die and a receiving substrate and methods to passively align a photonic die to a receiving substrate. A passive alignment process may not include precision multi-axis micro-manipulators and feedback control to move a photonic die into a final aligned position with respect to the receiving substrate. Instead, a pick-and-place tool may be used to place a photonic die in an unaligned position, from which it can be slid into an aligned position. In at least some embodiments, passive alignment may refer to alignment of a component to within a degree of accuracy better than that offered by any machine used to perform the alignment, and in some embodiments may be guided alignment. For example, passive alignment according to some embodiments described herein may include substrate-guided alignment of a component to within a degree of accuracy better than that offered by any machine used to perform the alignment.

According to some embodiments, a photonic die may be patterned to include a mesa that includes at least one waveguide and three alignment surfaces. The mesa and alignment surfaces may all have minimum dimensions significantly larger than an alignment accuracy required for the photonic die. The mesa may occupy more than one-quarter of the photonic die. Two of the alignment surfaces may be vertical surfaces that are non-orthogonal and non-parallel. Two of the alignment surfaces may be formed using lithographic patterning and etching techniques. The three alignment surfaces may be arranged such that, when contacting three complementary alignment surfaces on a receiving substrate, they align the at least one waveguide with one or more waveguides on the receiving substrate to within a required alignment accuracy in six degrees of freedom. Because at least two alignment surfaces are formed lithographically, their locations can be determined to sub-micron accuracy and they can be used to provide substrate-guided alignment of the photonic die to a receiving substrate to sub-micron accuracy. In contrast, diced or cleaved dies have uncertainties in the locations of die edges to more than 10 microns, and would not be suitable for substrate-guided alignment to sub-micron accuracy.

Aspects and embodiments described above, as well as additional aspects and embodiments, are described further below. These aspects and/or embodiments may be used individually, all together, or in any suitable combination of two or more, as the application is not limited in this respect.

The inventors have recognized that a number of considerations may be taken into account for aligning a photonic substrate of a first semiconductor type to a photonic substrate of a second semiconductor type. One or more of these considerations may be satisfactorily addressed by one or more of the present embodiments and are described in the following paragraphs.

One consideration is that the alignment of a first photonic substrate to a second photonic substrate typically requires high accuracy for six degrees of freedom. The six degrees of freedom may be positional accuracy along X, Y, and Z orthogonal axes and rotational accuracy about each of the three axes. The high accuracy is mainly required to position ends of waveguides or exit ports of optical couplers on a first substrate with respect to ends of optical waveguides or mating ports of optical couplers on a second substrate.

Another consideration is that alignment of a first photonic substrate to a second photonic substrate should include matching of optical mode-field sizes exiting from waveguides on a first substrate to mode-field sizes accepted by optical waveguides on a second substrate.

Another consideration is that alignment of a first photonic substrate to a second photonic substrate should include reduction of spurious optical reflections at waveguide-to-waveguide coupling regions interfaces.

Another consideration is that alignment of a first photonic substrate to a second photonic substrate should include low thermal resistance between each substrate and/or between a substrate and a heat sink and/or source, such as a heat reservoir or thermo-electric cooler (TEC). This can be important for substrates that include optical sources or optical amplifiers, which tend to dissipate appreciably more heat than silicon photonic chips.

Another consideration is that alignment of a first photonic substrate to a second photonic substrate should accommodate top and/or bottom surface electrical contacts on at least one substrate. However, in some embodiments, through-substrate vias may be used to facilitate electrical connections to top-side and bottom-side circuits from a same side of a substrate.

Another consideration is that alignment of a first photonic substrate to a second photonic substrate should allow for hermetic sealing of one and/or both substrates. For example, it may be beneficial to hermetically seal at least the substrate having optical sources or amplifiers or other active optical elements that may be sensitive to environmental conditions.

Another consideration is that any alignment scheme implemented for aligning a first photonic substrate to a second photonic substrate should allow for wafer-scale testing of individual substrates or dies (e.g., before dicing and aligning one photonic die to a receiving photonic substrate or another die).

Another consideration is that alignment of a first photonic substrate to a second photonic substrate should allow for wafer-scale testing of combined substrates (e.g., after dicing and aligning one photonic die to a receiving photonic substrate, but before dicing the receiving photonic substrate).

In overview and referring to the plan view of FIG. 1, portions of aligned photonic dies that include waveguides arranged to couple optical signals between the two dies are depicted. A portion of a first die 110 may include a first waveguide 112 and a second waveguide 114. The second die 120 may include a first optical waveguide 122 and a second optical waveguide 124. The inventors have recognized and appreciated that precise alignment of the waveguides on the first die to optical waveguides on the second die can require accurate relative positioning of the two dies to within approximately ±0.5 µm (e.g., along the axes X, Y, Z). Additionally, highly accurate rotational orientation about the X, Y, and Z axes to within approximately 2 milliradians may be needed. Ends of the waveguides may include tapered portions 130 that expand the optical mode-field size at exits and entrances of the waveguides. For example, an optical mode may be expanded to have a lateral waist of approximately 3 µm at an edge of either die in a coupling region 150 between the first die and second die. Even with mode-field expansion, misalignment of the waveguide in transverse directions (Y, Z) may be limited to approximately ±0.5 µm, although larger tolerances may be allowed in the X direction (e.g., ±1.5 µm). The inventors have recognized and appreciated that conventional alignment processes that use precision micromanipulators are time consuming and costly for the production of PICs. Accordingly, aspects and embodiments of the present application provide structures and techniques to passively align photonic dies to a receiving substrate.

Figure 2:
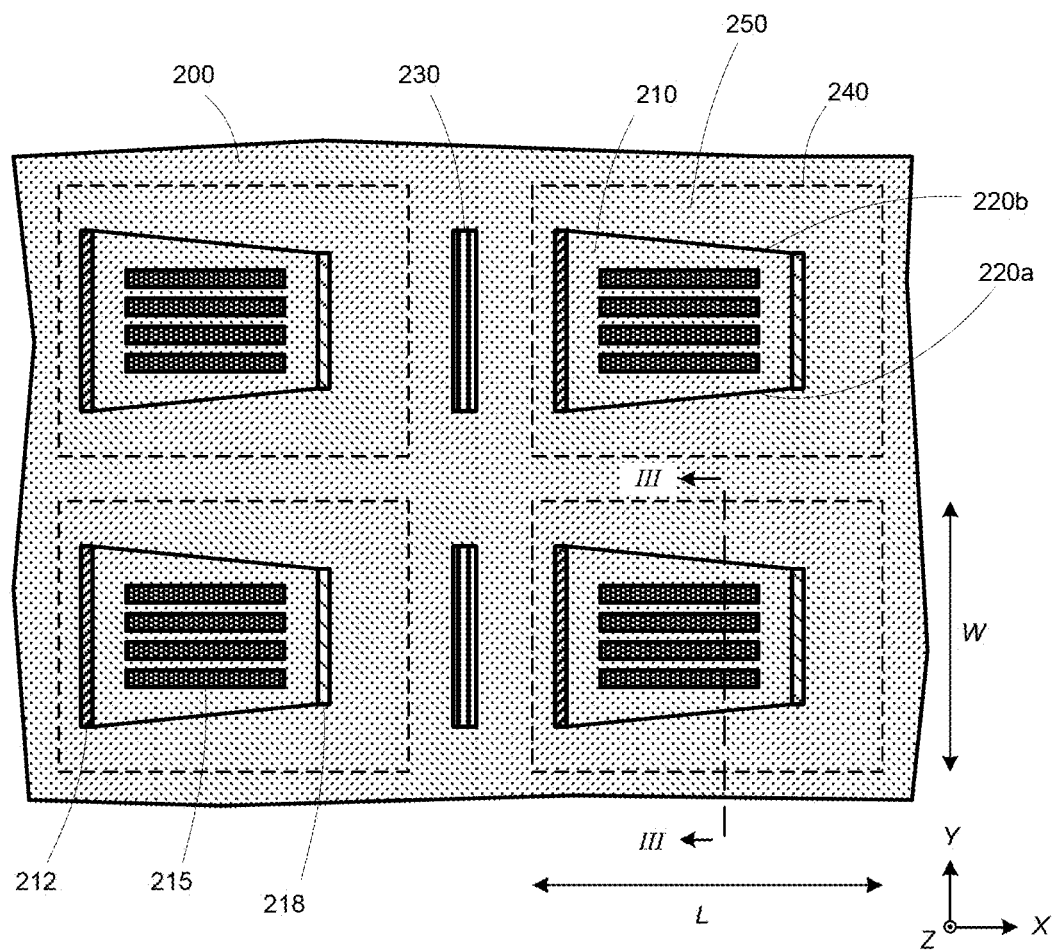
FIG. 2 depicts a portion of a wafer on which is patterned repeated groups of optical devices including mesas containing integrated photonic devices, according to some embodiments.

The plan view of FIG. 2 depicts an array of groups of optical elements that may be formed on a wafer 200, and later cleaved into photonic dies 250. Four photonic dies 250 are outlined in the drawing. The dimensions of the photonic dies are indicated by the dashed rectangle 240. Each group of optical elements may include a mesa 210, one or more waveguides formed in or on the mesa (not shown), one or more optical devices formed in or on the mesa (not shown), and a diffraction grating 230 or other reflective or light-scattering structure. In some embodiments, the mesa 210 may constitute more than 25% of the area of the die 250. In some embodiments, the mesa may constitute more than 50% of the area of the die. In other embodiments, the mesa may constitute more than 80% of the area of the die. According to some embodiments, the wafer 200 may comprise a 2-inch-diameter InP wafer that includes one or more semiconductor optical amplifiers (SOAs) and connecting waveguides formed within the mesa 210. The waveguides may include inverted taper spot-size converters to expand an optical mode-field size to approximately 9 µm² at facets of the waveguides.

A mesa 210 may be formed by an anisotropic etching process and comprise three alignment surfaces arranged for passive alignment of the die 250 to a receiving substrate. According to some embodiments, at least two of the alignment surfaces 220a, 220b may comprise vertical walls of the mesa 210, meaning they are oriented in the Z direction of FIG. 2. As shown, these two surfaces may be non-orthogonal and non-parallel. According to some embodiments a first alignment surface 220a may be at a first angle with respect to an X axis that is between about 10° and about 70°. A second alignment surface 220b may be at a second angle with respect to an X axis that is between about 10° and about 70° and in an opposite direction (e.g., the first angle may have a positive value with respect to the X axis and the second angle may have a negative value with respect to the X axis, thereby giving the mesa a wedge-shaped contour. In some implementations, the absolute values of the first angle and second angle with respect to the X axis may be approximately the same, whereas in other implementations they may be different.

When alignment surfaces are described as being vertical, the alignment surfaces extend in a direction out of the plane of the wafer 200 or substrate on which the mesa 210 is formed. Vertical alignment surfaces need not be oriented at 90° with respect to the substrate surface, but may be oriented at approximately 90° in some embodiments.

Although the mesas 210 are depicted as trapezoids having wedge-shaped contours, any other suitable shape may be used that includes wedge-shaped contours. Examples of other shapes include polygons having three, five, or more surfaces, of which at least two surfaces may form a wedge-shaped contour. In some embodiments, one or two surfaces of a wedge-shaped contour may be curved or flared. According to some embodiments, the trapezoidal shape may facilitate fabrication and may allow for more usable die real estate and higher passive-alignment accuracy than other contour shapes.

The inventors have recognized and appreciated that dicing or cleaving a photonic die is typically done in a manner such that the dimensions of the die can only be controlled to approximately ±5 µm. Such dimensional control is not suitable for passive alignment of a photonic die with another die when coupling optical signals between waveguides formed on the two dies. However, by etching the mesa 210, its dimensions and sidewall locations can be determined highly accurately with respect to waveguides formed on the mesa using semiconductor lithography tools, such that the formed mesa is well-suited for passive alignment. Additionally, etching the facets of the waveguides at edges of the mesa, rather than forming them by cleaving, has the advantage that the waveguide exit surfaces are optically suitable for wafer-scale testing of active optical devices formed in the mesas. Reflective or scattering structures such as gratings 230 can be formed on the wafer to aid the light extraction from a surface of the wafer 200.

In some embodiments, each mesa 210 may include a high-reflective coating 212 covering first ends or facets of the waveguides formed in or on the mesa, and an anti-reflection coating 218 located covering second facets of the waveguides. In other embodiments, anti-reflection coatings 218 may be formed over both facets of waveguides. Reflective coatings may be formed on facets of the waveguides by masked conformal depositions or angled physical depositions. There may be one or more electrodes 215 patterned on a surface of the mesa that are configured to convey electrical current to and activate one or more optical devices formed within the mesa.

When referring to microstructures such as waveguides patterned on a substrate, the term "on" may be used instead of "in or on" to denote a location of the microstructures on or near a process surface of the substrate. A microstructure formed "on" a substrate may be located on the surface of the substrate or embedded partly into or below the surface of the substrate. For example, a waveguide formed on a mesa may be on a top surface of the mesa, or may be embedded in the mesa.

According to some embodiments, a length L of a die 250 to be diced or cleaved from the wafer 200 may be between approximately 400 μm and approximately 1000 μm. A width of the die W may be between approximately 200 μm and approximately 200 μm, according to some embodiments. Other die sizes may be used in other embodiments. In regions between the dies, there may be diffraction gratings 230 patterned on the wafer 200. The gratings may be arranged so that light exiting from a waveguide on the mesa will strike the grating and diffract light out of the plane of the wafer. Light detected from the diffraction grating may be used to evaluate operation of one or more active optical devices on the corresponding mesa 210 at the wafer level.

Figure 3:
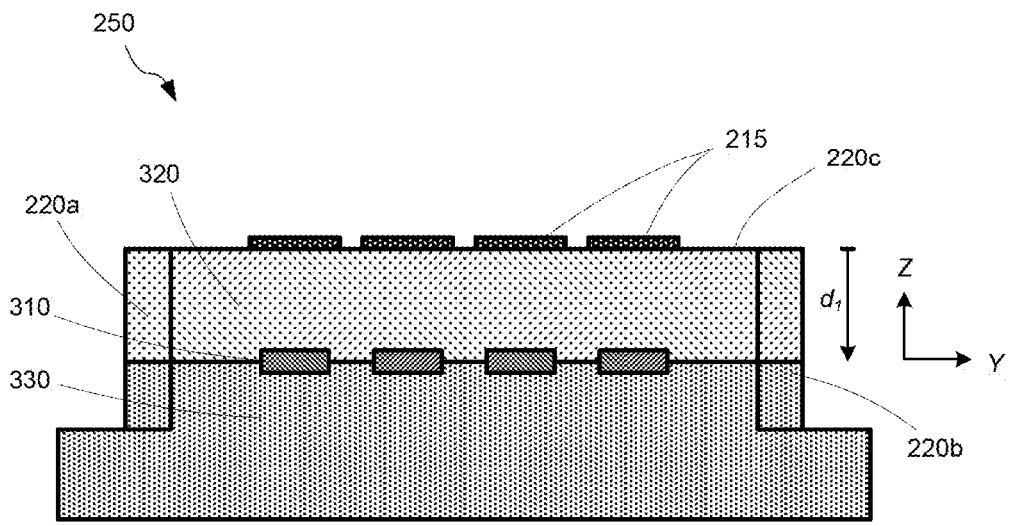
FIG. 3 depicts an elevation view of a photonic die having a mesa with integrated photonic devices, according to some embodiments.

An elevation view of a photonic die 250 diced or cleaved from the wafer 200 of FIG. 2 is depicted in FIG. 3, according to some embodiments. The elevation view represents a cross-section of the die indicated by the cut line marked "III" in FIG. 2. The arrows at the end of the cut line in FIG. 2 indicate the direction of view for FIG. 3. Therefore, elements illustrated in FIG. 3 may be at different depths beyond the cut line, in a direction into the page.

According to some embodiments, a photonic die 250 may include a first doped semiconductor region 320 and a second doped semiconductor region 330. The first region 320 may comprise a doped semiconductor of a first conductivity type (e.g., p-type conductivity). The second region 330 may comprise a doped semiconductor of a second conductivity type (e.g., n-type conductivity). The die 250 may further include one or more optical waveguides 310 and one or more electrodes 215 patterned above the waveguides. In some implementations, the electrodes 215 may comprise gold (Au) pads for eutectic bonding.

According to some embodiments, the waveguides 310 may be located the distance $d_1$ below an upper surface (third alignment surface 220c) of the photonic die 250. The upper surface may not be etched in some implementations. The distance $d_1$ may be between approximately 500 nm and approximately 3 μm, and may be determined accurately to within approximately 10% of the distance $d_1$ from an earlier epitaxial process during which the first doped semiconductor region 320 was formed. According to some embodiments, the first photonic die 250 may comprise one or more active optic devices (e.g., semiconductor laser diodes, light-emitting diodes, semiconductor optical amplifiers, optical phase modulators, optical amplitude modulators, etc.).

Although FIG. 2 and FIG. 3 depict alignment surfaces as being formed on the mesa 210, alignment surfaces need not all be formed on the mesa. In some embodiments, two vertical alignment surfaces may be formed on a portion of the substrate outside an area covered by the mesa. In other embodiments, the die itself may be lithographically patterned and etched so that at least one sidewall of the die constitutes an alignment surface.

Figure 4A:
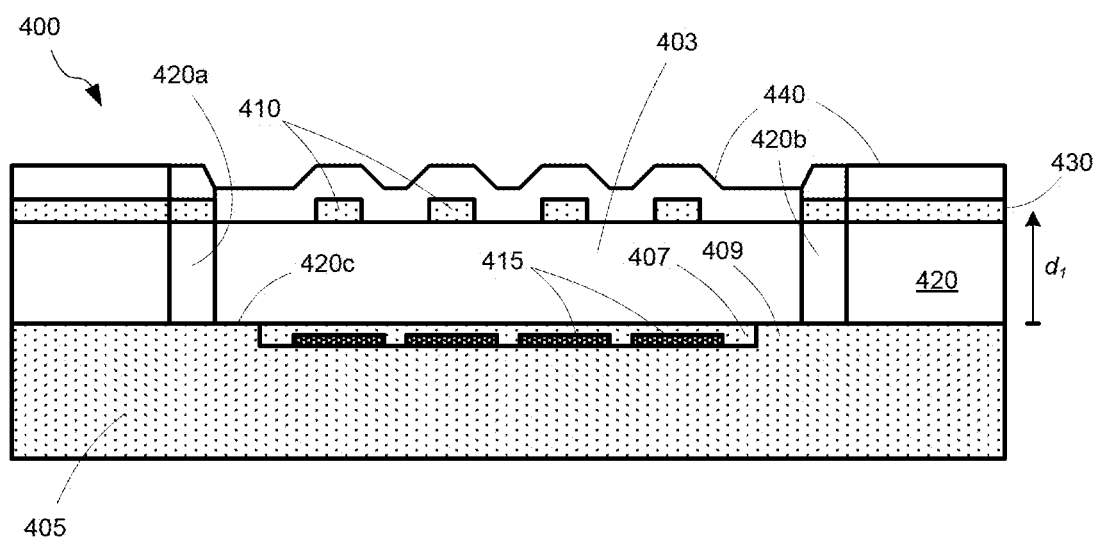
FIG. 4A depicts a cross-section view of a receiving substrate to which the photonic die of FIG. 3 may be passively aligned, according to some embodiments.

FIG. 4A depicts an elevation view of a portion of a receiving substrate 400, according to some embodiments, that has been microfabricated to receive the photonic die 250. The elevation view represents a cross-section of the receiving substrate indicated by the cut line marked "IVa" in FIG. 4B. The arrows at the end of the cut line in FIG. 4B indicate the direction of view for FIG. 4A. Therefore, elements illustrated in FIG. 4A may be at different depths beyond the cut line, in a direction into the page.

The receiving substrate may comprise another photonic die, a wafer, a portion of a wafer, a photonic chip, or any type of photonic integrated circuit such as a silicon PIC. The receiving substrate may comprise a substrate of a semiconductor type that is different from the semiconductor type of the photonic die 250 shown in FIG. 3. For example, the receiving substrate may include a semiconductor substrate 405 that may comprise silicon, and the semiconductor type of the first photonic die 250 may comprise indium phosphide, gallium arsenide, or any other suitable semiconductor that may be used to form an active optical device. In some embodiments, the receiving substrate may comprise group IV semiconductor material, and the photonic die may comprise group III-V semiconductor materials, or vice versa. The term "substrate" may be used to refer to a substrate of a wafer or portion of a wafer, a substrate of a photonic chip, or a substrate of a photonic die.

In some embodiments, the receiving substrate 400 may comprise an SOI wafer that includes silicon photonic integrated circuits (SiPICs). The SOI wafer may be 4 inches, 6 inches, or larger in diameter, and may be used as a carrier wafer on which to align and bond photonic dies 250. In other embodiments, a third wafer may be used as a carrier wafer and the receiving substrate 400 may comprise a SiPIC die. The photonic die 250 may be mounted on the SiPIC die and both mounted on the third wafer for wafer-scale testing, according to some embodiments.

In some embodiments, the receiving substrate 400 may comprise a semiconductor on insulator (SOI) wafer. For example, an oxide or other insulating layer 420 may be formed on the substrate 405, and a thin semiconductor layer 430 (e.g., silicon) may be formed on the insulating layer 430. In some implementations, the layer 430 may comprise any suitable dielectric layer for forming optical waveguides (e.g., silicon-nitride, or silicon-oxynitride). A receiving substrate 400 may also include a passivating or oxide or other insulating layer 440 formed over the semiconductor or dielectric layer 430.

According to some embodiments, the receiving substrate 400 may comprise an interposer comprising glass and/or silicon. An interposer may also comprise an SOI wafer, and may be primarily a passive substrate used to route optical signals.

A receiving substrate 400 may also include a receiving cavity 403 formed in a surface of the receiving substrate. The receiving cavity 403 may extend from a top surface of the receiving substrate to an upper surface 420c of the semiconductor substrate 405. The receiving cavity 403 may be sized to receive a mesa 210 of a photonic die 250.

In some implementations, the receiving cavity may include three alignment surfaces 420a, 420b, and 420c. These alignment surfaces may be complementary to the alignment surfaces 220a, 220b, 220c on the mesa shown in FIG. 3. One or more waveguides 410 may be formed from the semiconductor or dielectric layer 430 and mate to waveguides 310 on the first photonic die 250. In some embodiments a recess 407 may be formed in the semiconductor substrate 405, within which one or more complementary electrodes 415 may be formed. The complementary electrodes may mate to electrodes 215 on the photonic die 250.

According to some embodiments, AuSn solder pads may be used on the photonic die and/or receiving substrate for future eutectic bonding of the photonic die to the receiving substrate. Other bonding techniques may be used in other embodiments, such as thermocompression bonding. A thin eutectic bonding can provide high thermal conductive properties, and dissipate heat from the photonic die more readily.

The formation of the recess 407 may leave a ledge 409 extending along at least a portion of the periphery of the receiving cavity 403, according to some embodiments. In other embodiments, other patterns may be used to form the recess 407 such that pedestals or rails remain at the base of the receiving cavity. Upper surfaces of the ledge, pedestals and/or rails may be an upper surface of the semiconductor substrate 405 and comprise a third complementary alignment surface 420c of the receiving substrate.

Figure 4B:
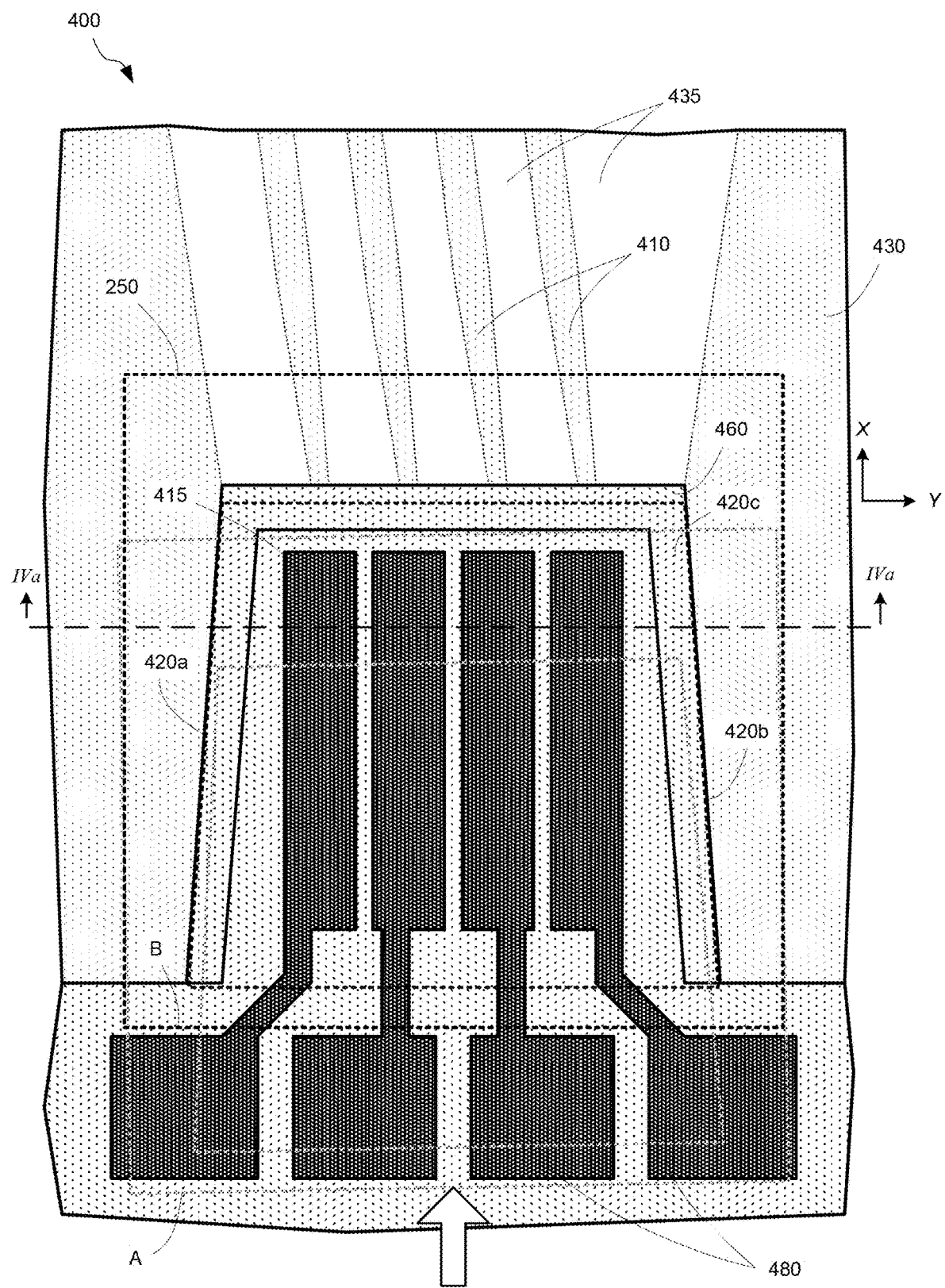
FIG. 4B depicts a plan view of the receiving substrate of FIG. 4A, according to some embodiments.

A plan view of a portion of the receiving substrate 400 is depicted in FIG. 4B. The illustration includes a cut line marked "IVa" that corresponds to the elevation view shown in FIG. 4A. In this drawing, the layer 430 covered by passivation layer 440 is illustrated with gray shading to indicate the location of optical waveguides 410. In some implementations, the passivation layer 440 is transparent or semi-transparent, so that layer 430 and waveguides 410 may be seen in an optical microscope. Alternatively, an infrared camera may be used to image fiducial alignment marks through the substrate. The receiving substrate 400 may include a receiving cavity 403 into which the photonic die 250 may be placed and passively aligned. According to some embodiments, two walls of the recessed region 420a, 420b may comprise first and second complementary alignment surfaces that mate to alignment surfaces 220a, 220b on the photonic die 250. A third complementary alignment surface 420c may be located at a base of the receiving cavity, as described above. In some embodiments, the third complementary alignment surface 420c comprises a surface of the semiconductor substrate 405 that is exposed after etching the receiving cavity 403. According to some embodiments, the three complementary alignment surfaces may be formed in a single mask-and-etch process, as described in further detail below.

The recess 407 at the base of the receiving cavity may include complementary electrodes 415 of any suitable shape that meet to electrodes 215 on the photonic die 250. Electrical traces may run from the complementary electrodes 415 to one or more contact pads 480 that may also be included in the recess 407. The pads 480 may allow for wire bonding to other pads located on the receiving substrate 400, so that electrical contact can be made to the top side of the photonic die when aligned at the bottom of the receiving cavity.

In some embodiments, optical waveguides 410 on the receiving substrate may extend from an edge of the receiving cavity as shown, and connect to an extended photonic integrated circuit. In some implementations, the optical waveguides may intersect with an edge of the receiving cavity at an angle, as depicted, to minimize deleterious effects of optical reflections from end facets of the waveguides. In such embodiments, anti-reflection coatings may not be needed on the facets of the waveguides. The optical waveguides 410 may be formed from the layer 430 by removing portions of the layer to form cleared regions 435. For the embodiment shown in FIG. 3 and FIG. 4B, the waveguides 310 on the photonic die 250 and those on the receiving substrate 400 run substantially in an X direction.

In other embodiments, the die waveguides 310 and optical waveguides 410 may run substantially in a Y direction, so that optical signals may pass through the photonic die 250 (side-to-side) rather than exit from and/or enter a single side of the photonic die 250. In yet other embodiments, three edges of the mesa can be used to couple light between waveguides on the photonic die and the receiving substrate. In some embodiments, a waveguide running through an SOA may be coupled at both ends to make a through-type (e.g., single-pass or ring) SOA.

FIG. 4B also includes dashed lines to indicate placement and alignment of a photonic die 250 on the receiving substrate 400. According to some embodiments a photonic die 250, as depicted in FIG. 3, may be inverted and placed in an unaligned position A on the receiving substrate 400. The gray, dashed rectangle depicts a location of the bottom of the photonic die, and the gray, dashed trapezoid depicts a location of the mesa 210 of the photonic die in an unaligned position. In this position, the photonic die is at an angle with respect to, and displaced from, an aligned position B which is indicated by the black, dashed rectangle and trapezoid.

The accuracy of placement of the photonic die 250 in the unaligned position may be greater than 25 microns, according to some embodiments, or even larger in other embodiments. The rotational accuracy may be greater than 2 degrees. For such large tolerances, micro-manipulators may not be required to place the photonic die in the first unaligned position A.

After being placed in an unaligned position, the photonic die 250 may be slid along one alignment surface (e.g., along surface 420c in the X direction indicated by the arrow) into an aligned position B. In the aligned position, alignment surfaces 220a, 220b, 220c of the photonic die (e.g., surfaces of the mesa) may contact complementary alignment surfaces 420a, 420b, 420c of the receiving substrate 400. In the aligned position, the photonic die may be aligned through substrate-guided alignment to required accuracies in all six degrees of freedom. For example, the photonic die 250 may be aligned to within ±0.5 μm of a target position in the X, Y, and Z directions. Additionally, the photonic die 250 may be aligned to within 2 milliradian of target angles with respect to the X, Y, and Z axes.

In some embodiments, a subsequent active alignment process may be performed (e.g., if passive alignment does not meet a target alignment accuracy). For example, active alignment may be carried out in the X and Y directions or Y direction. Accordingly, a one- or two-dimensional micromanipulator may be used for the active alignment, which is not an overly complicated process. The process may include an optical feedback mechanism (e.g., activating an optical device on the mesa while detecting optical coupling to the receiving substrate, imaging alignment features patterned on the photonic die and receiving substrate). According to some embodiments, a post-reflow alignment accuracy of less than 0.5 μm can be achieved along X and/or Y directions.

Once in an aligned position B, the photonic die may be eutectically bonded to the receiving substrate. A drawback to eutectic bonding or solder bonding is that a high temperature may be required. According to some embodiments, a reflow solder temperature may be reached by using a laser or integrated micro-heater to heat the electrodes 215 and mating electrodes 415. In some implementations, Au—Au compression bonding may be used to secure the photonic die in place. In other embodiments, the photonic die may be bonded to the receiving substrate with epoxy or a UV-curable adhesive after alignment. Epoxy bonding may be done under vertical compression to improve electrical and thermal contact between electrodes 215 and mating electrodes 415.

When in the aligned position, there may be a gap in a coupling region 460 between the photonic die waveguides 310 and optical waveguides 410 of the receiving substrate. The size of the gap may be between approximately 50 nm and approximately 5 μm. In some implementations, the size of the gap may be between approximately 50 nm and approximately 2 μm. According to some embodiments, alignment in the direction oriented substantially along the waveguides (X direction in the illustrated embodiment) is less sensitive to misalignment than alignment along the transverse (Y or Z) directions, so that larger variations in the coupling gap 460 may be tolerated.

Figure 5A:
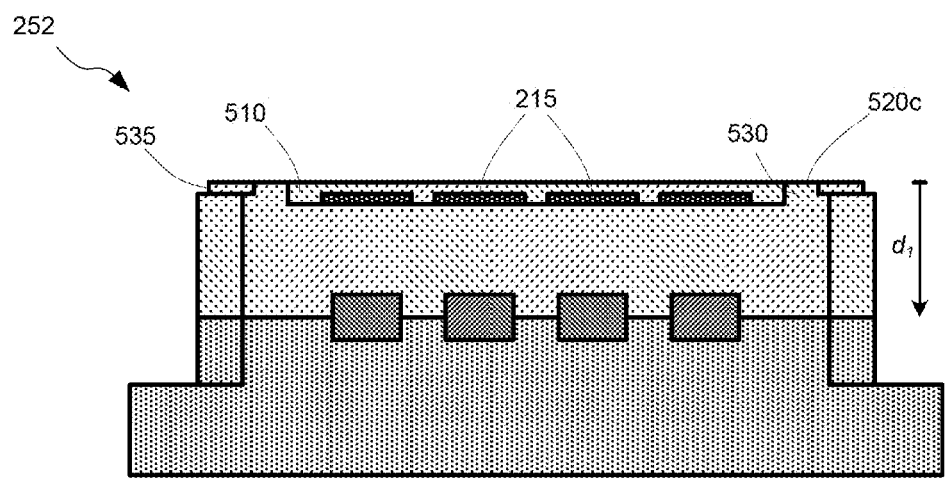
FIG. 5A depicts an alternative structure of a photonic die, according to some embodiments.

An alternative embodiment of a photonic die is depicted in FIG. 5A. In some embodiments, a photonic die 252 may include one or more rails 530 formed on a top surface of the photonic die. In some implementations, a rail may be formed continuously around the periphery of the top surface of the photonic die, or several rails and/or pedestals may be formed on the top surface of the photonic die. For example, some rails or pedestals may be formed between electrodes 215. Rails and/or pedestal may be formed by etching a recess 510 into the top surface of the photonic die 252. A width of a pedestal or rail 530 may be between approximately 20 μm and approximately 50 μm. A depth of the recess 510 may be between approximately 200 nm and approximately 500 nm. Subsequently, electrodes 215 may be formed in the recess.

In some embodiments, the depth of the recess 510 allows for extension of mating electrodes 415 on the receiving substrate 400 to enter into the recess 510 and contact electrodes 215 of the photonic die 252. In other embodiments, solder material may be placed on the electrodes of the photonic die or the mating electrodes of the receiving substrate and used to bond the aligned photonic die to the receiving substrate. If a recess 510 is formed in the top of the mesa 210, a recess 407 may not be formed at a base of the receiving cavity 403 on the receiving substrate, and vice versa.

According to some embodiments, a top surface of the mesa, that remains after forming a rail 530, may comprise a third alignment surface for the photonic die 252. In some embodiments, the top surface may be un-etched. According to some implementations, upper edges of the mesa may be etched back to form a rounded corner or notch 535, as depicted in FIG. 5A. The notch 535 may accommodate "feet" that can occur at the bottom of the receiving cavity 403 on the receiving substrate 400. The feet may remain after the vertical etch at the base of the complementary alignment surfaces 420a, 420b. For example, the feet may be a result of an etch process that does not completely clear the oxide 420 at the edges of the receiving cavity 403.

As may be appreciated with reference to FIG. 3 or FIG. 5A, the distance $d_1$ between a third alignment surface 220 C of the photonic die 250 and the waveguides 310 can be determined with a high degree of accuracy. For example, the waveguides 310 on the photonic die 250 may be formed at a doping junction of an active optical device. After formation of the waveguides, the first doped region 320 may be epitaxially grown above the waveguides with a high degree of accuracy using metal-organic chemical vapor deposition (MOCVD) or other suitable deposition process. In such processes, the thickness of the first doped region 320 may be known to better than approximately ±10% of the total deposition thickness. Accordingly, the distance $d_1$ may be known to within approximately ±300 nm for a 3-micron-thick deposition layer.

Similarly, the distance $d_1$ on the receiving substrate 400 may also be determined highly accurately. For example the thickness of an oxide formed in an SOI wafer can be determined to within approximately 50 nm using optical thin-film measuring techniques. Accordingly, the distance between the third complementary alignment surface 420c and the layer 430 in which optical waveguides are formed can be known to within approximately 50 nm, according to some embodiments. Therefore, when a photonic die 250 is aligned in the receiving cavity 403 of the receiving substrate 400, the alignment of the waveguides 310 of the photonic die to the optical waveguides 410 of the receiving substrate in the Z direction may be better than approximately ±400 nm.

Figure 5B:
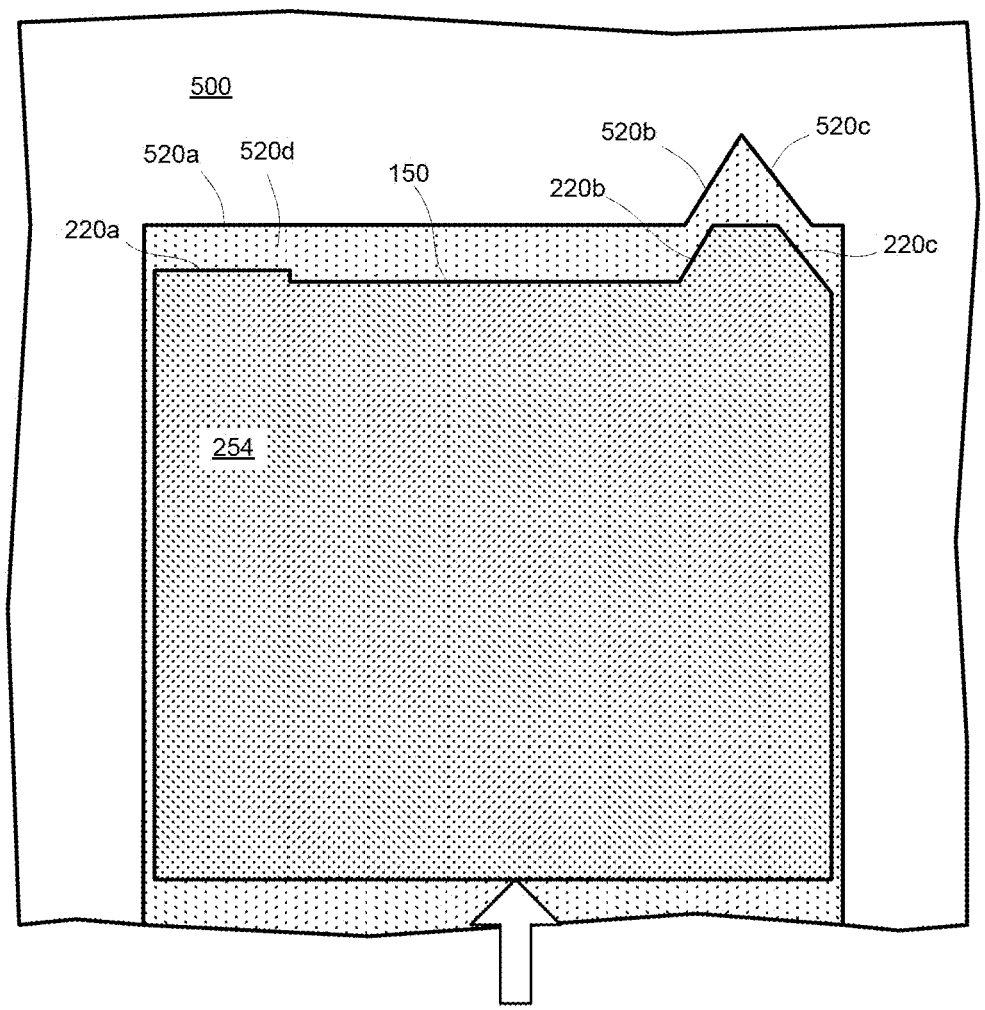
FIG. 5B depicts an alternative structure of a photonic die, according to some embodiments.

FIG. 5B illustrates an alternative embodiment of a photonic die 254 and receiving substrate 500. In some embodiments, there may be four or more alignment surfaces (220a, 220b, 220c, and a top surface of the photonic die) that are used to passively align the photonic die to the receiving substrate 500. Similarly, the receiving substrate 500 may include four alignment surfaces 520a, 520b, 520c, and surface 520d. In the depicted embodiment, the photonic die 254 may be substantially rectangular in shape. Three of the alignment surfaces on the photonic die may be patterned in a single etching step and comprise sidewalls of the photonic die. Similarly three of the alignment surfaces of the receiving substrate 500 may be patterned in a single etching step and form sidewalls of the receiving cavity. As described above, the photonic die 254 may be placed in an unaligned position on the receiving substrate 500, and then slid into an aligned position (as indicated by the arrow at the bottom of the drawing).

Figure 5C:
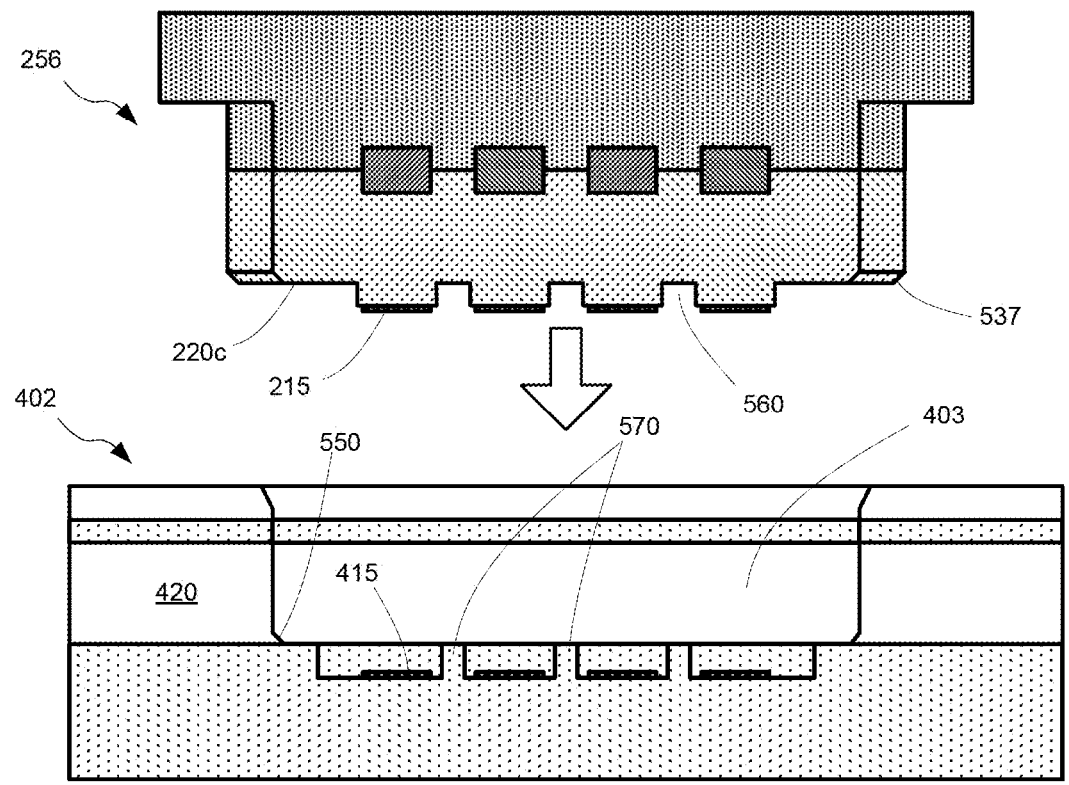
FIG. 5C depicts alternative structures of a photonic die and a receiving substrate, according to some embodiments.
Figure 5D:
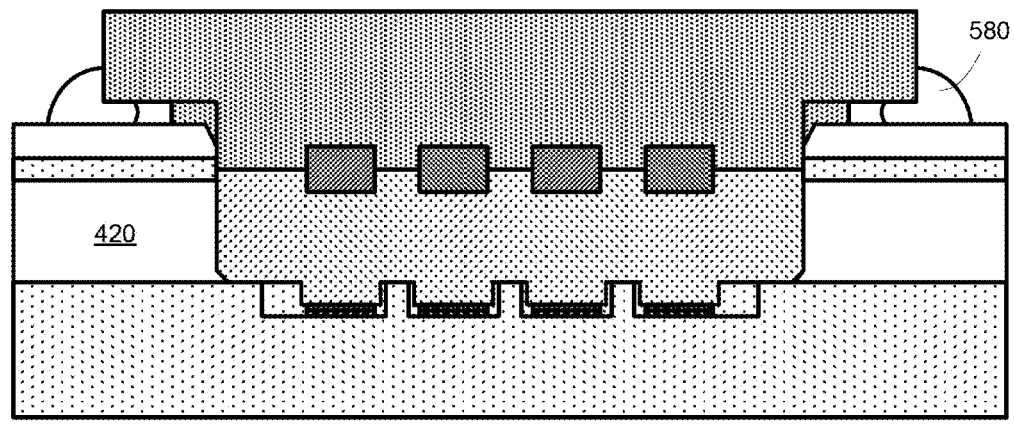
FIG. 5D depicts a photonic die in a receiving cavity of a receiving substrate; according to some embodiments.

Elevation views of alternative embodiments of a photonic die 256 and receiving substrate 402 are depicted in FIG. 5C and FIG. 5D, and depict insertion of a photonic die into a receiving cavity 403 of the receiving substrate. The view of the receiving substrate is taken from an opposite direction than that of FIG. 4A. In some embodiments, pedestals or rails 570 may be formed near the electrodes 215, 415 on either the photonic die or the receiving substrate. Complementary recesses or trenches 560 may be formed near the electrodes 215, 415 on either the photonic die or the receiving substrate. For example, trenches 560 may be formed by etching back the top surface of the mesa to form the third alignment surface 220c on the photonic die. The etching back of the top surface may result in rounded corners 537 of the mesa (e.g., if a semi-isotropic etch is used). The rounded corners may accommodate residual feet 550 at the base of the receiving cavity. In the receiving cavity, the top of the pedestals or rails 570 may constitute a portion of an alignment surface which contacts an alignment surface 220c on the photonic die when positioned in the receiving cavity. In some embodiments, pedestals and/or rails 570 and recesses and/or trenches 560 may be located outside of an area that encloses the electrodes. After alignment of the photonic die within the receiving cavity, an adhesive 580 may be used to additionally or alternatively bond the photonic die to the receiving cavity. In some embodiments, the adhesive may shrink when cured, so that it creates a compressive stress between electrodes 215 on the photonic die and electrodes 415 on the receiving substrate.

A photonic die and receiving substrate that include passive alignment surfaces may be formed using conventional lithography processes, according to some embodiments.

Example structures associated with processes for forming a photonic die 250 are illustrated in FIG. 6A through FIG. 6F. According to some embodiments, waveguides 310 and one or more active optical devices may be formed on a planar semiconductor wafer 200. An etch mask 610 may be patterned above the waveguides 310. The etch masks 610 may comprise a soft mask (e.g., formed from a resist using any suitable lithographic process) or a hard mask (e.g., patterned in a material such as an oxide or nitride using any suitable lithographic process). In some embodiments, an etch mask 610 may be formed using optical projection photolithography in which a mask is aligned to the wafer 200, and a photoresist layer previously deposited on the wafer is exposed through the mask.

In some embodiments, the alignment of the mask to the wafer 200 uses a highly accurate process so that the resist mask 610 is subsequently aligned over the waveguides 310 to within ±0.25 μm in the Y and X directions. Such alignment accuracy is possible with current optical projection photolithography tools. The inventors have recognized and appreciated that this alignment step can locate the alignment surfaces of the photonic die and complementary alignment surfaces of the receiving substrate with respect to their respective waveguides, and provide highly accurate waveguide alignment between the photonic die and receiving substrate.

Figure 6A:
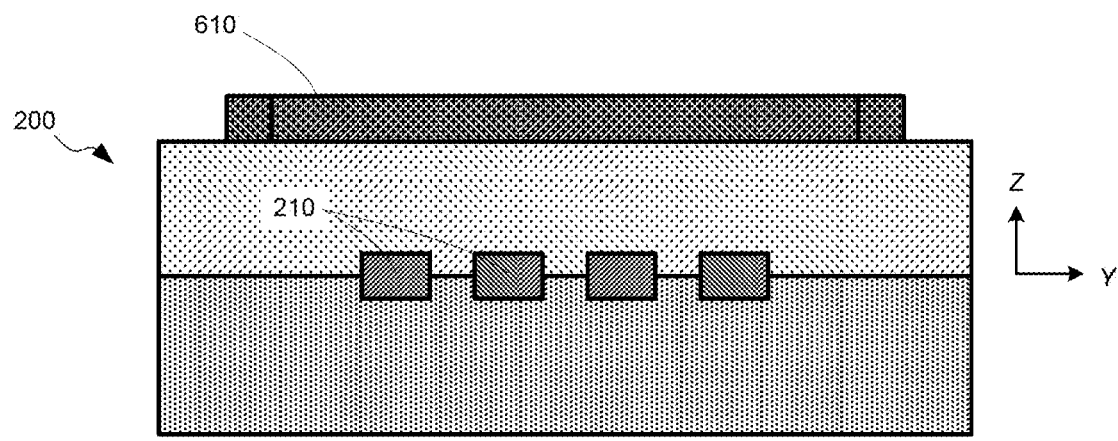
FIG. 6A depicts a structure associated with a process for patterning a mesa of a photonic die, according to some embodiments.
Figure 6B:
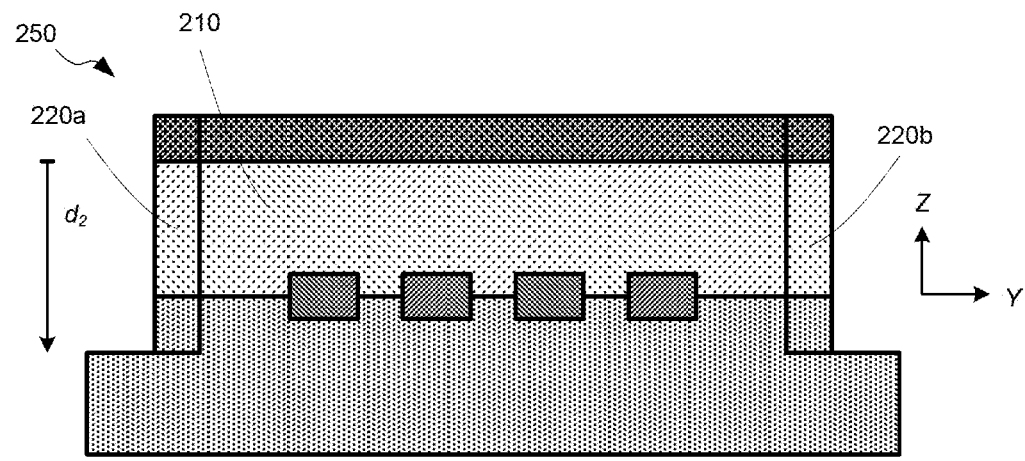
FIG. 6B depicts a structure associated with a process for patterning a mesa of a photonic die, according to some embodiments.

After the etch mask 610 has been formed, and anisotropic etching process (for example, reactive ion etching) may be carried out to etch portions of the wafer as depicted in FIG. 6B. In various embodiments, the etch extends a distance $d_2$ into the wafer 200 to form mesas 250 across the wafer, as depicted in FIG. 2. The etching may form substantially vertical sidewalls of the mesas, of which at least two sidewalls form alignment surfaces 220a, 220b. The etch mask 610 may then be removed from the mesa using any suitable process (for example, a dry etch or wet etch).

Figure 6C:
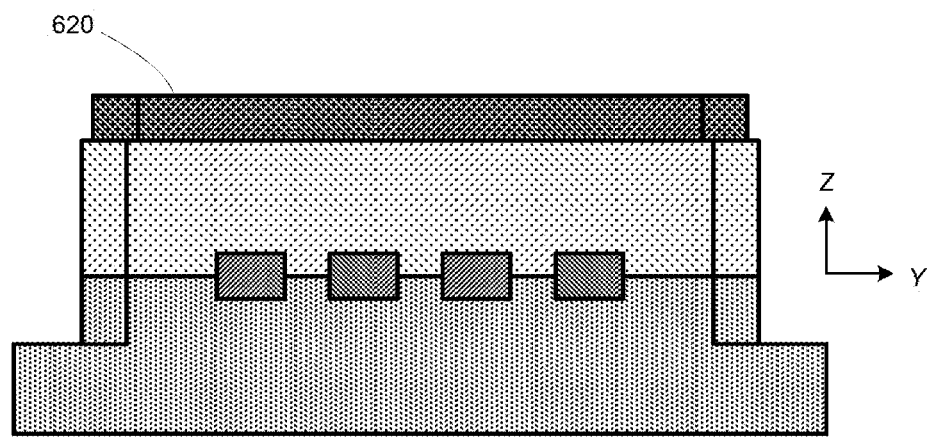
FIG. 6C depicts a structure associated with a process for patterning a mesa of a photonic die, according to some embodiments.
Figure 6D:
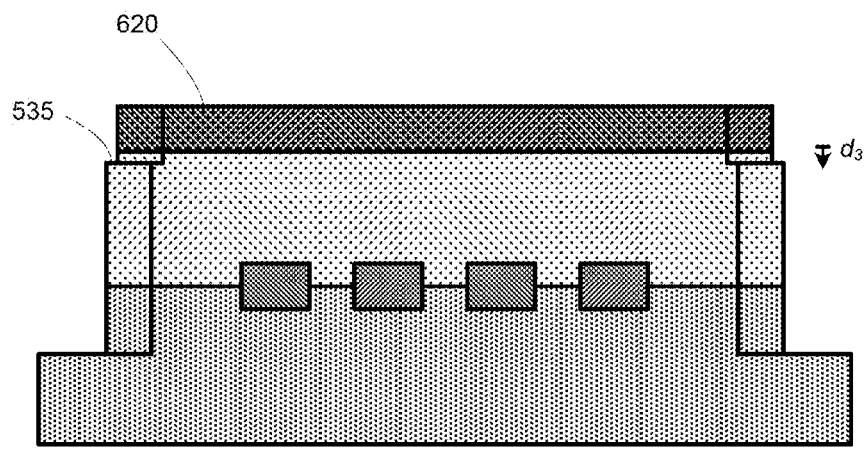
FIG. 6D depicts a structure associated with a process for patterning a mesa of a photonic die, according to some embodiments.

In some implementations, a second etch mask 620 may be formed on the mesa, as depicted in FIG. 6C. Alignment of the second etch mask 620 is not critical, and need not use an alignment process described for FIG. 6A. The second etch masks 620 may be a soft mask or a hard mask. After forming the second etch mask, top corners of the mesa may be etched back to form notches 535 as shown in FIG. 6D. According to some embodiments, an anisotropic dry etch may be used to etch a periphery of the top surface back a distance $d_3$. The distance $d_3$ may be between approximately 50 nm and approximately 200 nm, according to some embodiments. In some implementations, the steps associated with FIG. 6C and fiction FIG. 6D may not be used, and notches 535 may not be formed.

Figure 6E:
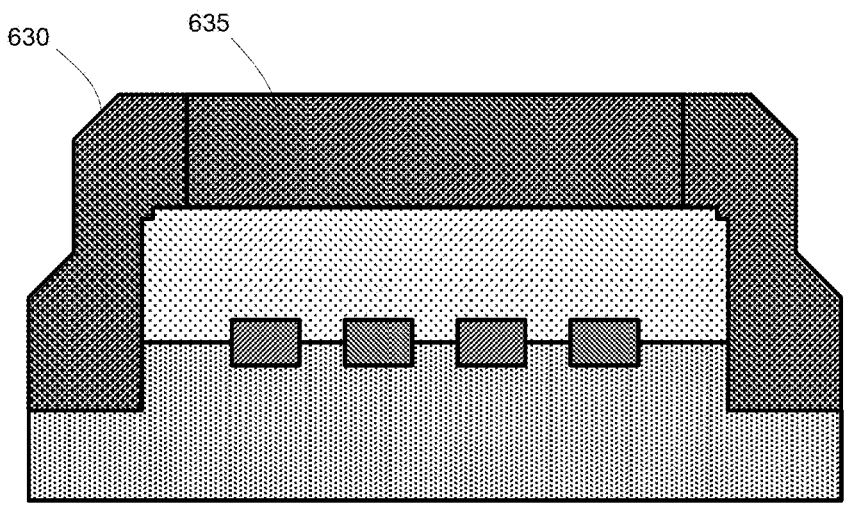
FIG. 6E depicts a structure associated with a process for patterning a mesa of a photonic die, according to some embodiments.
Figure 6F:
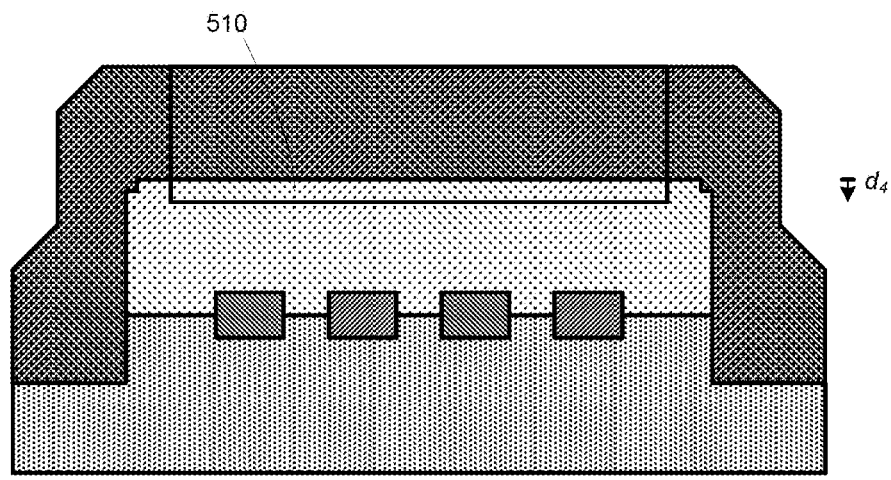
FIG. 6F depicts a structure associated with a process for patterning a mesa of a photonic die, according to some embodiments.

According to some embodiments, a third etch mask 630 may be formed over the mesa and surrounding substrate, as illustrated in FIG. 6E. A via 635 may be patterned in the third etch masks 630 to expose a top portion of the mesa. After opening the via, a recess 510 may be etched into the top of the mesa, as depicted in FIG. 6F, to accommodate electrodes. The etch depth $d_4$ may be between approximately 50 nm and approximately 2 μm. In some embodiments the steps associated with FIG. 6E and FIG. 6F may not be used, and instead electrodes may be patterned on a top surface of the mesa, as illustrated in FIG. 3.

Figure 7A:
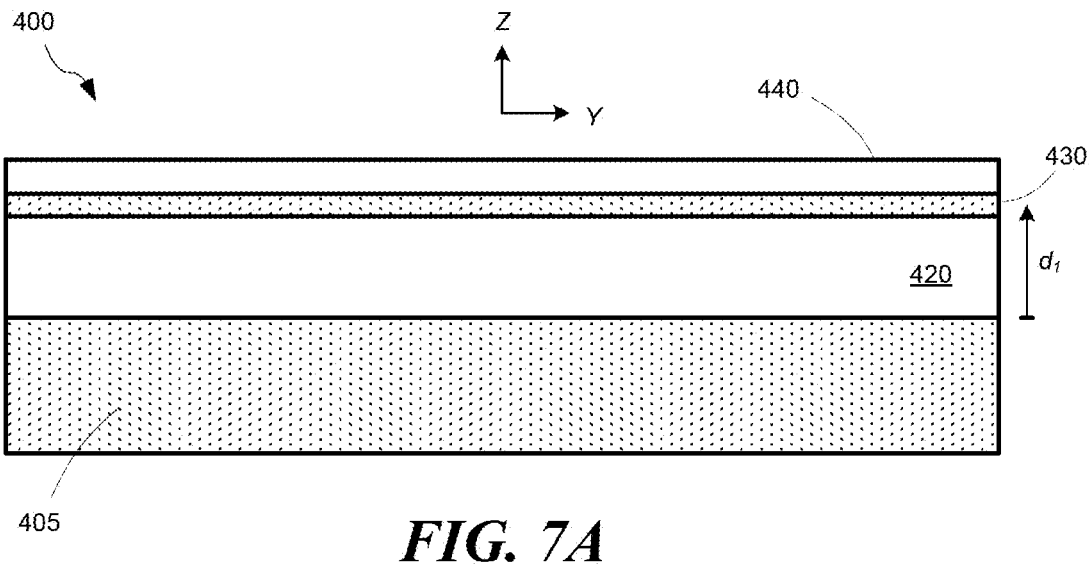
FIG. 7A depicts a structure associated with a process for patterning complementary alignment surfaces on a receiving substrate, according to some embodiments.

According to some embodiments, a receiving cavity 403 on the receiving substrate 400 may also be formed using conventional lithography processes. According to some embodiments, a semiconductor-on-insulator wafer, a portion of which is depicted in FIG. 7A, may be used for the receiving substrate 400. The receiving substrate may include a bulk semiconductor substrate 405 comprising a majority of the receiving substrate and an oxide layer 420 formed over the semiconductor. At a distance $d_1$ above a surface of the bulk substrate 405 there may be a semiconductor or dielectric layer 430 in which one or more optical waveguides (not shown) are formed. In some cases, there may be an additional oxide layer or other passivating layer 440 formed over the dielectric layer 430.

Figure 7B:
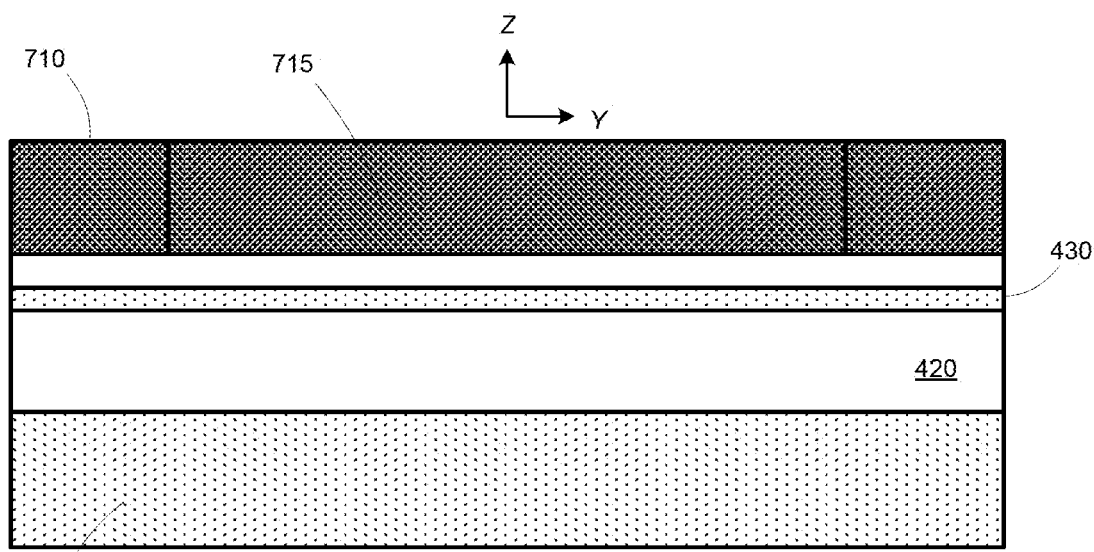
FIG. 7B depicts a structure associated with a process for patterning complementary alignment surfaces on a receiving substrate, according to some embodiments.

A mask 710 (either a hard mask or soft mask) may be patterned over the substrate surface in a region where a receiving cavity 403 will be formed, as depicted in FIG. 7B. In some implementations, the resist 710 may comprise a photoresist, polysilicon, or nitride layer. A via 715 may be patterned in the resist 710 to form the receiving cavity. According to some embodiments, the via 715 may be aligned to one or more waveguides on the receiving substrate 400 with a high degree of accuracy (e.g., using a similar optical lithography and mask-to-substrate alignment process described above for forming the etch mask 610 in FIG. 6A).

Figure 7C:
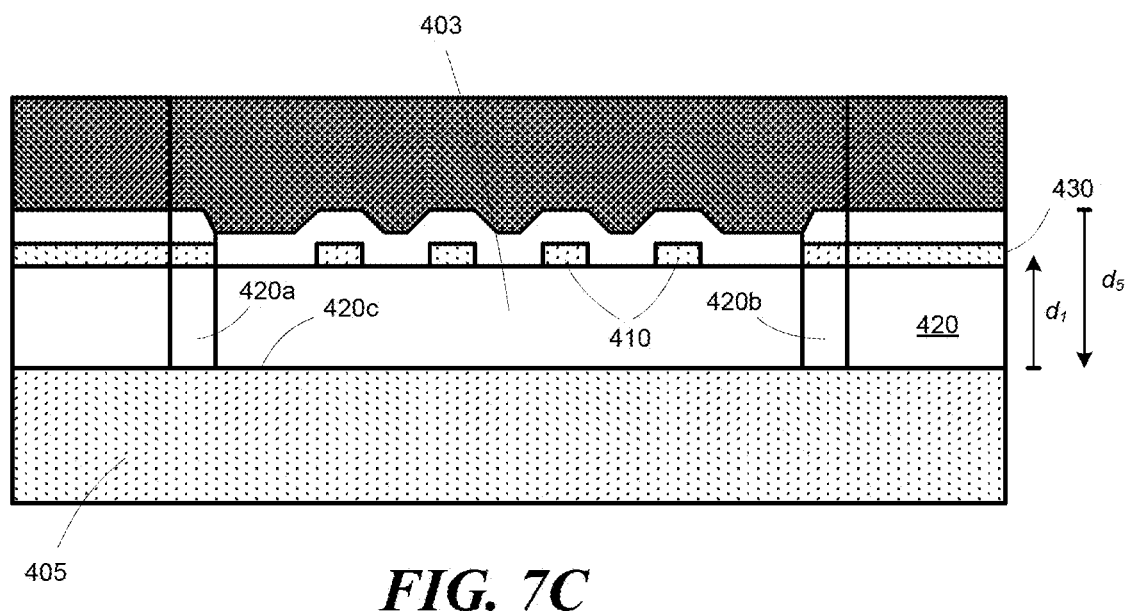
FIG. 7C depicts a structure associated with a process for patterning complementary alignment surfaces on a receiving substrate, according to some embodiments.

After forming the via 715, an anisotropic dry etch may be used to etch the receiving cavity 403 into the receiving substrate 400, as depicted in FIG. 7C. An etch depth $d_5$ of the receiving cavity may be between approximately 1 μm and approximately 4 μm. As with the process for forming the mesa 210, a single etch step may form sidewalls and complementary alignment surfaces 420a, 420b of the receiving cavity. Additionally, due to a difference in materials between the bulk substrate 405 and the oxide layer 420, the same etching process may stop on the surface of the bulk substrate 405, exposing the third complementary alignment surface 420c. Accordingly, the distance $d_1$ between the third complementary alignment surface 420c and the optical waveguides 410 of the receiving substrate can be determined highly accurately. In some implementations, a timed etch and/or in-situ measurement of the etch depth may be performed to determine $d_5$ highly-accurately while etching is performed.

Figure 8:
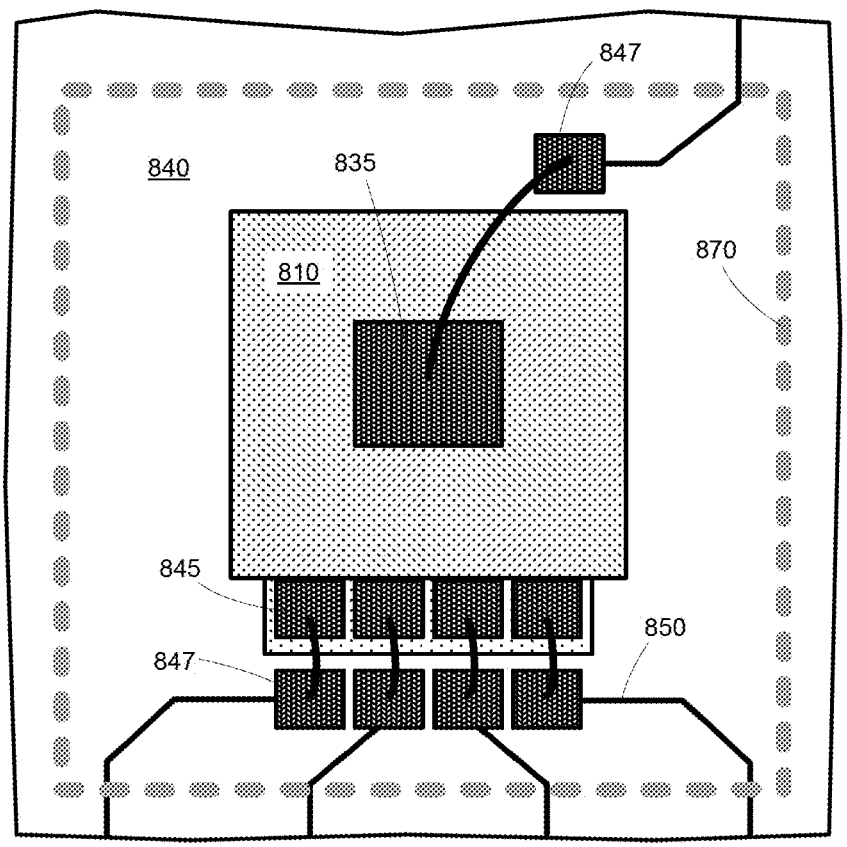
FIG. 8 depicts a photonic die aligned to a receiving substrate over which a hermetic seal may be formed, according to some embodiments.

FIG. 8 depicts a plan view of a receiving substrate 840 and photonic die 810 aligned within a receiving cavity of the receiving substrate. The photonic die 810 is inverted in the drawing. Wire bonds may be used to make electrical connections between contact pads 845 at a base of the receiving cavity and contact pads 847 on a surface of the receiving substrate 840. Patterned conductive traces 850 may be formed on the receiving substrate, and connect the contact pads 847 to other contact pads near a periphery of the receiving substrate 840. Additionally, one or more wire bonds may be formed from one or more bottom-side contacts 835 on the photonic die 810 and a contact pad 847 on the receiving substrate 840.

According to some embodiments, a region around the photonic die 810 may be substantially planar so that a hermetic seal may be attached to the receiving substrate 840 to protect the photonic die. For example, a hermetic seal in the form of a cover may be bonded to the receiving substrate along the dashed line 870 indicated in FIG. 8. In other embodiments, any suitable passivation layer (e.g., an oxide or polymer) may be deposited over the region to hermetically seal the area around the photonic die.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, and/or methods described herein, if such features, systems, articles, materials, and/or methods are not mutually inconsistent, is included within the scope of the present disclosure.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

In the claims, as well as in the specification above, all transitional phrases such as "comprising," "including," "carrying," "having," "containing," "involving," "holding," "composed of," and the like are to be understood to be open-ended, i.e., to mean including but not limited to. The transitional phrases "consisting of" and "consisting essentially of" shall be closed or semi-closed transitional phrases, respectively.

What is claimed is:

1. A photonic die comprising:
    a mesa;
    a first optical waveguide formed on the mesa;
    wherein the mesa comprises three contact alignment surfaces including a first wedge-shaped surface and two vertical walls contacting respective edges of the first wedge-shaped surface, wherein the three contact alignment surfaces are arranged to contact complementary alignment surfaces on a receiving substrate thereby providing sub-micron passive alignment of the first optical waveguide in at least three degrees of freedom to a second optical waveguide on the receiving substrate.

2. The photonic die of claim 1, wherein the two vertical walls of the mesa are non-orthogonal surfaces.

3. The photonic die of claim 1, wherein the three contact alignment surfaces, when contacting complementary alignment surfaces, provide passive alignment of the first optical waveguide to the second optical waveguide in six degrees of freedom.

4. The photonic die of claim 1, wherein the at least three degrees of freedom are translational degrees of freedom, and wherein the alignment of the first optical waveguide to the second optical waveguide is within ±0.5 microns for at least two of the translational degrees of freedom.

5. The photonic die of claim 1, wherein the mesa covers more than one-quarter a surface of the photonic die.

6. The photonic die of claim 1, wherein a smallest dimension of any of the three contact alignment surfaces is at least 100 times larger than an alignment accuracy achieved between the first optical waveguide and second optical waveguide.

7. The photonic die of claim 1, wherein the three contact alignment surfaces are on the mesa.

8. The photonic die of claim 1, wherein the mesa forms a trapezoid.

9. The photonic die of claim 1, wherein the three contact alignment surfaces are arranged, such that the photonic die may be placed in an unaligned position on the receiving substrate and slid into an aligned position.

10. The photonic die of claim 1, further comprising an active optical device formed in the mesa and connected to the first optical waveguide.

11. The photonic die of claim 10, wherein the active optical device is a semiconductor laser, a semiconductor optical amplifier, a semiconductor optical phase modulator, or a semiconductor optical amplitude modulator.

12. The photonic die of claim 1, further comprising:
    the receiving substrate attached to the photonic die; and
    a hermetic seal bonded to the receiving substrate and enclosing the photonic die.

13. The photonic die of claim 12, wherein the photonic die comprises a first type of semiconductor material and the receiving substrate comprises a second type of semiconductor material.

14. The photonic die of claim 12, wherein the photonic die comprises group III-V materials and the receiving substrate comprises group V materials.

15. The photonic die of claim 12, further comprising at least one additional waveguide on the photonic die aligned to at least one additional optical waveguide on the receiving substrate.

16. An apparatus comprising:
    a photonic die including a mesa extending from a planar surface of the photonic die; and
    an optical waveguide formed on the mesa, wherein the mesa has a wedge-shaped upper contact alignment surface parallel the planar surface of the photonic die and two additional contact alignment surfaces and wherein the wedge-shaped upper contact alignment surface and the two additional contact alignment surfaces are arranged to contact complementary alignment surfaces on a receiving substrate to provide sub-micron alignment of the optical waveguide to a second waveguide on the receiving substrate.

17. The apparatus of claim 16, wherein the mesa constitutes more than 50% of a surface area of the photonic die.

18. The apparatus of claim 16, further comprising an active optical device formed on the mesa.

19. The apparatus of claim 16, wherein a first end and a second end of the optical waveguide are located at an edge of the mesa.

20. The photonic die of claim 1, wherein the three contact alignment surfaces contact the complementary alignment surfaces on the receiving substrate.

21. The photonic die of claim 1, wherein the three contact alignment surfaces are in contact with the complementary alignment surfaces on the receiving substrate when the photonic die is placed in an aligned position on the receiving substrate.

\* \* \* \* \*